US005267159A

United States Patent [19]

O'Neall

[11] Patent Number: 5,267,159

[45] Date of Patent: Nov. 30, 1993

[54] MILEAGE RECORDING AND DISPLAY APPARATUS

[76] Inventor: Donald L. O'Neall, Rte. 1, Box 165, Downs, Ill. 61736

[21] Appl. No.: 32,406

[22] Filed: Mar. 12, 1993

Related U.S. Application Data

[63] Continuation of Ser. No. 581,906, Sep. 13, 1990, abandoned.

[51] Int. Cl.[5] ............ G06F 13/00

[52] U.S. Cl. ............ 364/424.04; 364/424.01; 364/561; 340/438

[58] Field of Search ............ 364/424.01, 424.03, 364/424.04, 561; 340/438, 439; 377/24

[56] References Cited

U.S. PATENT DOCUMENTS

| | | | |
|---|---|---|---|
| 4,547,781 | 10/1985 | Gelhorn et al. | 377/24 |
| 4,593,357 | 6/1986 | Van Ostrand et al. | 364/424.03 |
| 4,608,638 | 8/1986 | Tsikos | 364/424.04 |
| 4,638,289 | 1/1987 | Zottnik | 364/424.04 |
| 4,677,429 | 6/1987 | Glotzback | 364/424.04 |
| 4,685,061 | 8/1987 | Whitaker | 364/561 |
| 4,817,040 | 3/1989 | Bodley-Scott | 364/424.04 |
| 4,939,652 | 7/1990 | Steiner | 364/424.03 |
| 4,987,541 | 1/1991 | Levente et al. | 364/424.04 |
| 5,046,007 | 9/1991 | McCrery et al. | 364/424.03 |
| 5,065,320 | 11/1991 | Hayashi et al. | 364/424.04 |

*Primary Examiner*—Gary Chin
*Attorney, Agent, or Firm*—Emrich & Dithmar

[57] ABSTRACT

Apparatus use in a vehicle used for multiple business purposes or for business and personal use allows one to record and display mileage for each type of use. Employing a plurality of selectable memory banks each dedicated to a designated business or personal activity, the apparatus allows a user to select one of the memory banks following an automatic audio reminder after engine start-up. If no memory bank is selected, the apparatus automatically defaults to a designated memory bank. Vehicle mileage is then stored in either the selected or the designated default memory bank. A control/display module allows for the display of present trip mileage or mileage accumulated over a given period for each memory bank. Each memory bank retains recorded mileage until reset and cleared. Calibration of the device's odometer is provided for by a mode selector which also permits the display of vehicle speed or distance traveled in miles or feet.

10 Claims, 4 Drawing Sheets

MILEAGE RECORDING AND DISPLAY APPARATUS

This is a continuation of application Ser. No. 581,906, filed Sep. 13, 1990, now abandoned.

BACKGROUND OF THE INVENTION

This invention relates generally to vehicle mileage recording and is particularly directed to apparatus for recording and displaying mileage usage of a vehicle for multiple business uses as well as personal use.

The Internal Revenue Service (IRS) requires strict compliance with its mileage logging requirements for business related usage of a vehicle such as an automobile. Compliance with these requirements is generally by maintaining a written log wherein is recorded the mileage covered for business related activities. For most businessmen, these log entries are inconvenient and frequently just simply not made. Subsequent activities and distances covered frequently make it impossible to reconstruct earlier activity, particularly after extended periods of time. There is, therefore, a need for a system which permits one to record vehicle mileage in terms of business related activities which allows the mileage to be ascribed to personal versus business use, and to further permit mileage breakdown among various, separate business activities.

There are currently available a variety of vehicle installed devices for monitoring and displaying vehicle usage parameters. For example, most vehicles include a resettable trip odometer. The requirement to regularly reset this odometer for individual, separate business activity trips is difficult and frequently impractical for the businessman. Another device recently introduced allows an employer to automatically record a trip of an employee in a service vehicle, including total mileage traveled and the number and frequency of stops as well as total time and time between each stop. This system includes a built-in printer for providing a hard copy of trip data. Other computer-based arrangements inform the driver of the miles and time to go for reaching a programmed destination, the amount of fuel remaining in terms of miles which can be covered, and other useful information.

There is not presently available a trip monitoring arrangement which permits the monitoring, recording and display of the mileage of each of a large number of trips, each related to a separate business activity which allows one to maintain accurate business mileage records for income tax calculation purposes.

The present invention addresses the aforementioned limitations of the prior art by providing a mileage recording and display apparatus for use in a vehicle used for multiple business purposes or for business and personal use which allows for the recording and display of vehicle usage mileage for each type of activity. This invention contemplates storage of individual trip mileage as well as total mileage for all business and personal usage in a nonvolatile memory for subsequent recall in accurately reconstructing vehicle usage such as for tax calculation purposes.

OBJECTS AND SUMMARY OF THE INVENTION

Accordingly, it is an object of the present invention to record and display vehicle usage for each of a plurality of activities.

Another object of the present invention is to record and display mileage usage of a vehicle for each of a plurality of uses by storing the mileage related to each use in a respective one of a plurality of memory banks of a nonvolatile memory.

Yet another object of the present invention is to provide for the display and recording for each of a plurality of vehicle uses the current mileage as well as the cumulative miles for each such activity over a designated time period.

A further object of the present invention is to provide an electronic vehicle usage mileage log for recording, displaying and storing vehicle mileage usage related to each of a plurality of separate activities in a nonvolatile memory for subsequent recall.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
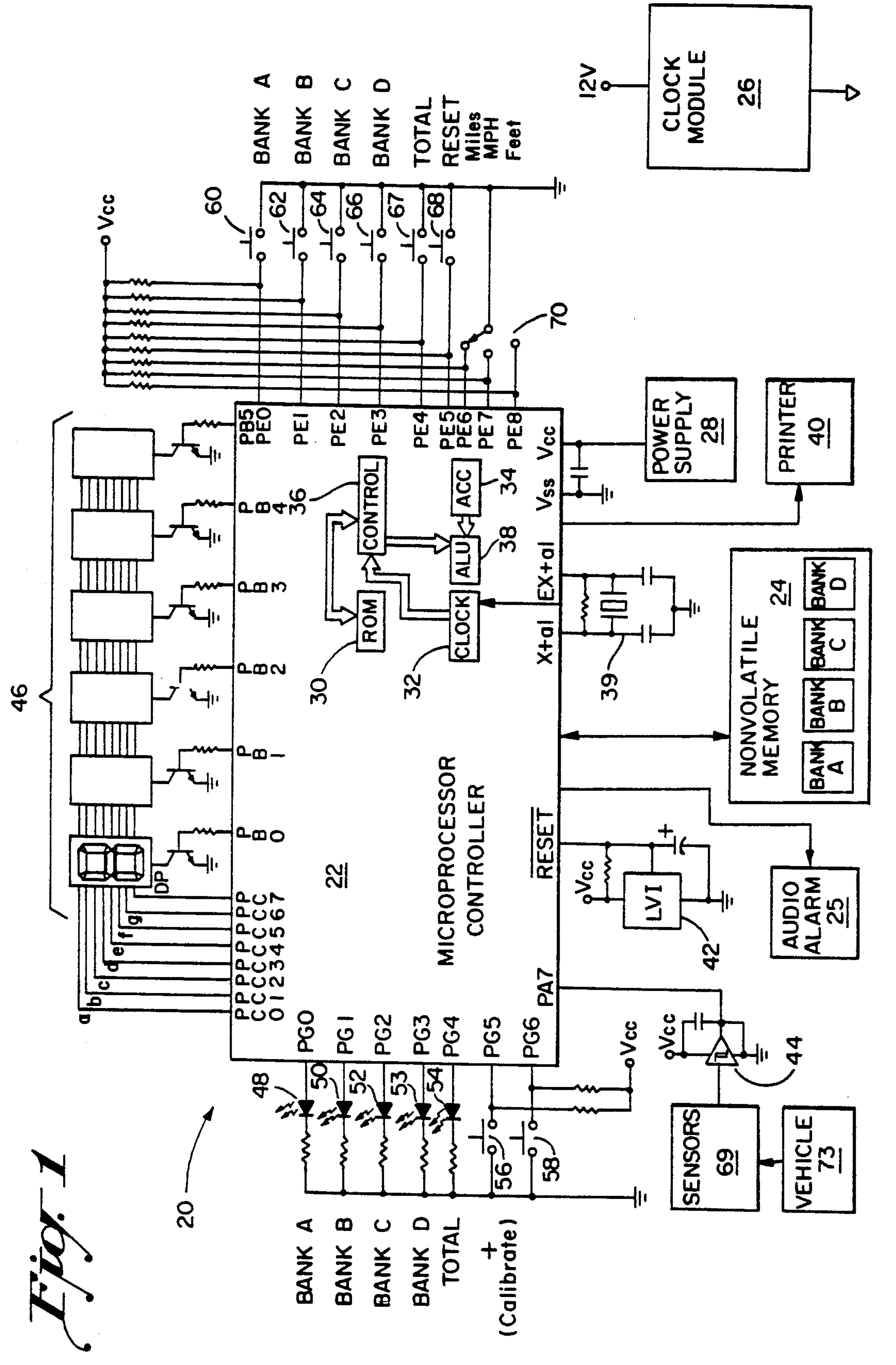
FIG. 1 is a simplified, combined schematic and block diagram of a mileage recording and display apparatus in accordance with the principles of the present invention.
Figure 2:
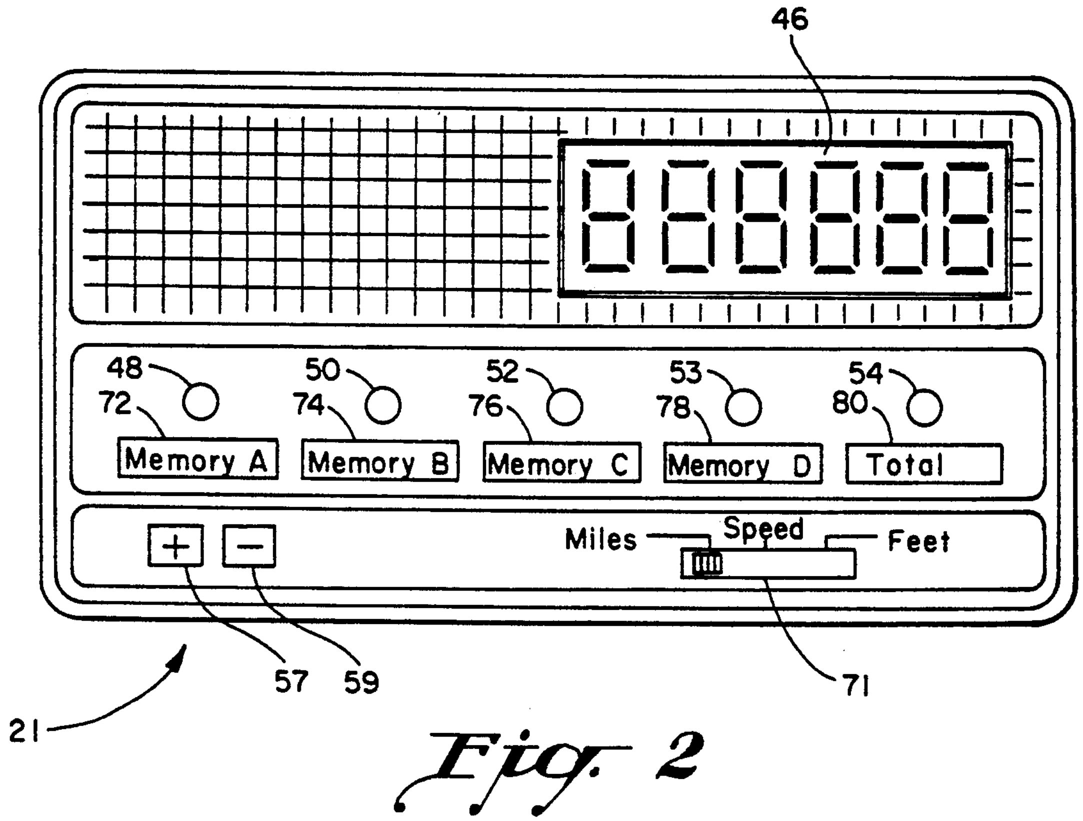
FIG. 2 is a plan view of a display and control module for use in the mileage recording and display apparatus of the present invention.

Referring to FIG. 1, there is shown in simplified, schematic and block diagram form a mileage recording and display apparatus 20 in accordance with the present invention. FIG. 2 is a plan view of a control and display module 21 for use in the mileage recording and display apparatus 20 of FIG. 1.

The mileage recording and display apparatus 20 includes a microprocessor controller 22 responsive to inputs from one or more sensors 69 which detect distance traveled as well as the speed of a vehicle 73. The sensors 69 may be in the form of magnetic sensors on the vehicle's drive shaft (not shown for simplicity) for monitoring the speed of the vehicle 73 as well as distance traveled. Appropriate interface circuitry such as including a buffer amplifier 44 couples the sensors 69 to the microprocessor controller 22. Other embodiments of this invention may employ a conventional plug-in wiring harness and snap-together connectors (not shown for simplicity) for coupling the mileage recording and display apparatus 20 to outputs from the vehicle's odometer and speedometer.

A reset circuit 42 is provided for resetting the microprocessor controller 22 at vehicle start-up. The microprocessor controller 22 may also be manually reset by means of a RESET switch 68. A regulated DC power supply 22 is coupled to the power input pin $V_{cc}$ of the microprocessor controller 22 providing DC power thereto. An audio alarm 25 is coupled to and operated by the microprocessor controller 22 which activates the audio alarm upon vehicle start-up to remind the user to select one of a plurality of memory banks by pressing one of four selector buttons 72, 74, 76 or 78 on the display and control module 21. A total mileage selector 80 is also provided on the display and control module 21 to allow a user to recall from memory and display total mileage traveled by the vehicle.

The microprocessor controller 22 may be conventional in design, with the Motorola MC68HCllFIFN, or equivalent, microprocessor used in a preferred embodiment. The microprocessor controller includes a read only memory (ROM) 30, a clock 32, an accumulator 34, a controller 36, and an arithmetic and logic unit (ALU) 38. The microprocessor stores instructions and data, periodically updates the stored data, compares both stored and real-time data and makes decisions based upon these comparisons by means of logic instructions in providing system control. The ROM 30 is a nonvolatile, factory produced memory matrix which includes a plurality of memory locations, or "bytes", in which are stored operating instructions and data.

An oscillator circuit 39 external to the integrated circuit (IC) microprocessor controller 18 provides timing signals to the clock 32 for controlling the timing of operations carried out by the microprocessor. Program instructions and data are stored in the ROM 30. When the vehicle is turned on, the microprocessor program stored in the ROM 30 causes binary signals representing a first instruction stored in the ROM to be coupled to the controller 36 and causes various other portions of the microprocessor controller 22 to be initialized for proper future operation. The ALU 38 receives binary control signals from the controller 36 and performs the required arithmetic or logic operation.

A nonvolatile memory 24 containing a plurality of memory banks A, B, C and D is coupled to the microprocessor controller 22 for storing mileage data therein. The nonvolatile nature of memory 24 allows it to retain data stored therein when power is removed therefrom, such as when the vehicle is turned off. Each of the memory banks A, B, C and D is used for storage of data related to a particular business or personal activity. Although only four memory banks are shown in the nonvolatile memory 24, the present invention is not limited to this number of memory banks and contemplates use of virtually any number of such memory banks for the storage of vehicle mileage for virtually any number of different types of activities. The nonvolatile memory 24 used in the present invention may be a 2817A Electrically Erasable Programmable Read Only Memory (EEPROM). The memory is programmed electrically in circuit and the data is retained even if power is removed and so does not require a battery back-up.

A printer 40 is coupled to the microprocessor controller 22 for providing a hard copy print-out of vehicle mileage stored in each of the banks A, B, C and D as well as total mileage on the vehicle. A clock module 26 is also provided for timing the operation of the mileage recording and display apparatus 20 in carrying out various operations thereof as described in the following paragraphs.

A plurality of switches 60, 62, 64, and 66 are coupled to the microprocessor controller 22 for selecting one of the memory banks in the nonvolatile memory 24. Thus, memory bank A is selected by engaging switch 60, and memory banks B, C and D are selected by engaging switches 62, 64 and 66, respectively. Switch 67 allows for the selection for display on a multi-digit LED display 46 of the total mileage stored in all of the aforementioned memory banks. To clear a memory bank, the switch for the selected memory bank is engaged for more than 5 seconds. This resets the contents of the selected memory bank to 0. The grand total of all memory banks is unaffected unless the TOTAL switch 67 is simultaneously engaged for more than 10 seconds. The duration of selection of a given switch is determined by means of the clock module 26. A plurality of selectors shown in FIG. 2 are coupled to the memory bank switches 60, 62, 64 and 66. Thus, selector 72 is coupled to memory bank A switch 60, while selectors 74, 76 and 78 are respectively coupled to memory bank B, memory bank C, and memory bank D switches 62, 64 and 66, respectively. A TOTAL memory selector 80 is coupled to the TOTAL memory switch 67 to allow for selection and display of the total mileage stored in all of the memory banks.

A three-position mode switch 70 is also coupled to the microprocessor controller 22 to allow for selection of the display of distance traveled in terms of either miles or feet, or the display of the speed of the vehicle in miles per hour. The mode switch 70 is coupled to a mode selector 71 on the display and control module 21. A plurality of light emitting diodes (LEDs) 48, 50, 52, 53 and 54 are positioned above the memory selectors on the display and control module 21 as shown in FIG. 2. Engagement of a given memory selector illuminates a corresponding LED positioned adjacent to that selector. Thus, engagement of the memory bank A selector 72 causes illumination of the memory bank A LED 48. Similar engagement of the memory bank B, C and D selectors 74, 76 and 78 results in a corresponding turn-on of the memory bank B, C and D LEDs 50, 52 and 53, respectively. Engagement of the TOTAL memory selector 80 causes illumination of a TOTAL memory LED 54.

The display and control module 21 also includes the aforementioned multi-digit LED display 46 for displaying the stored contents in each of the memory banks as well as the total mileage stored in all of the memory banks. In addition, distance traveled in terms of either miles or feet as well as the current speed of the vehicle, as selected by the mode selector 71, is also presented on the multi-digit LED display 46.

Also coupled to the microprocessor controller 22 are increase and decrease calibration switches 56 and 58. The mileage recording and display apparatus 20 is calibrated by means of these switches as follows. After driving a known distance in feet, the distance traveled is displayed on the multi-digit LED display 46 and compared with this known distance. By adjusting the number of feet indicated on the LED display 46 either upward by means of the increase (+) calibration switch 56 or downward by means of the decrease (−) calibration switch 58, the mileage recording and display apparatus 20 may be precisely calibrated for accurate distance measurement. Provided on the display and control module 21 are "+" and "−" selectors 57 and 59 respectively coupled to the increase and decrease calibration switches 56 and 58 to allow an operator to manually calibrate the distance measuring accuracy of the mileage recording and display apparatus 20.

Figure 3A:
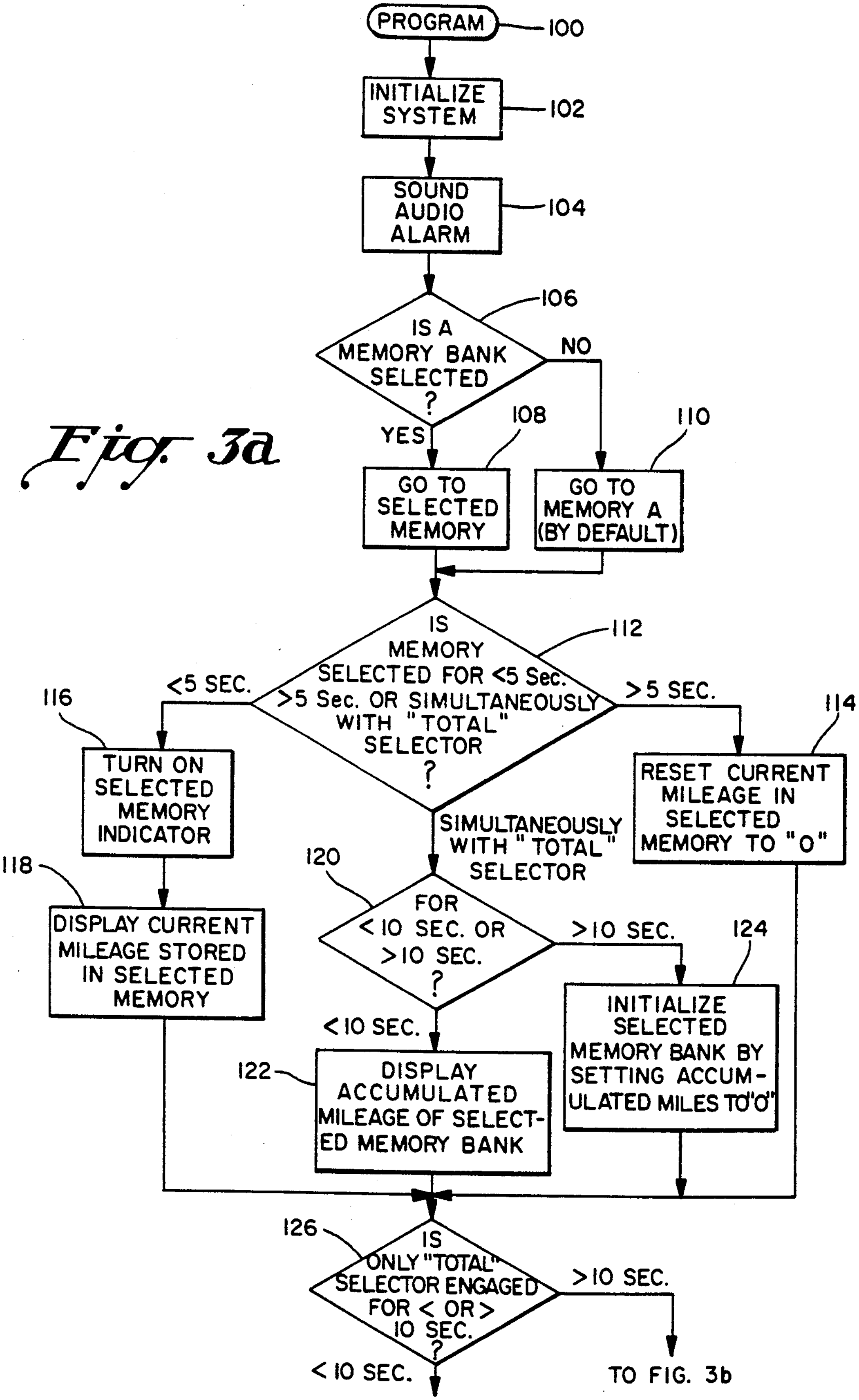
FIGS. 3*a* and 3*b* illustrate a flow diagram representing the steps carried out under the control of a microprocessor during operation of the mileage recording and display apparatus of the present invention.
Figure 3B:
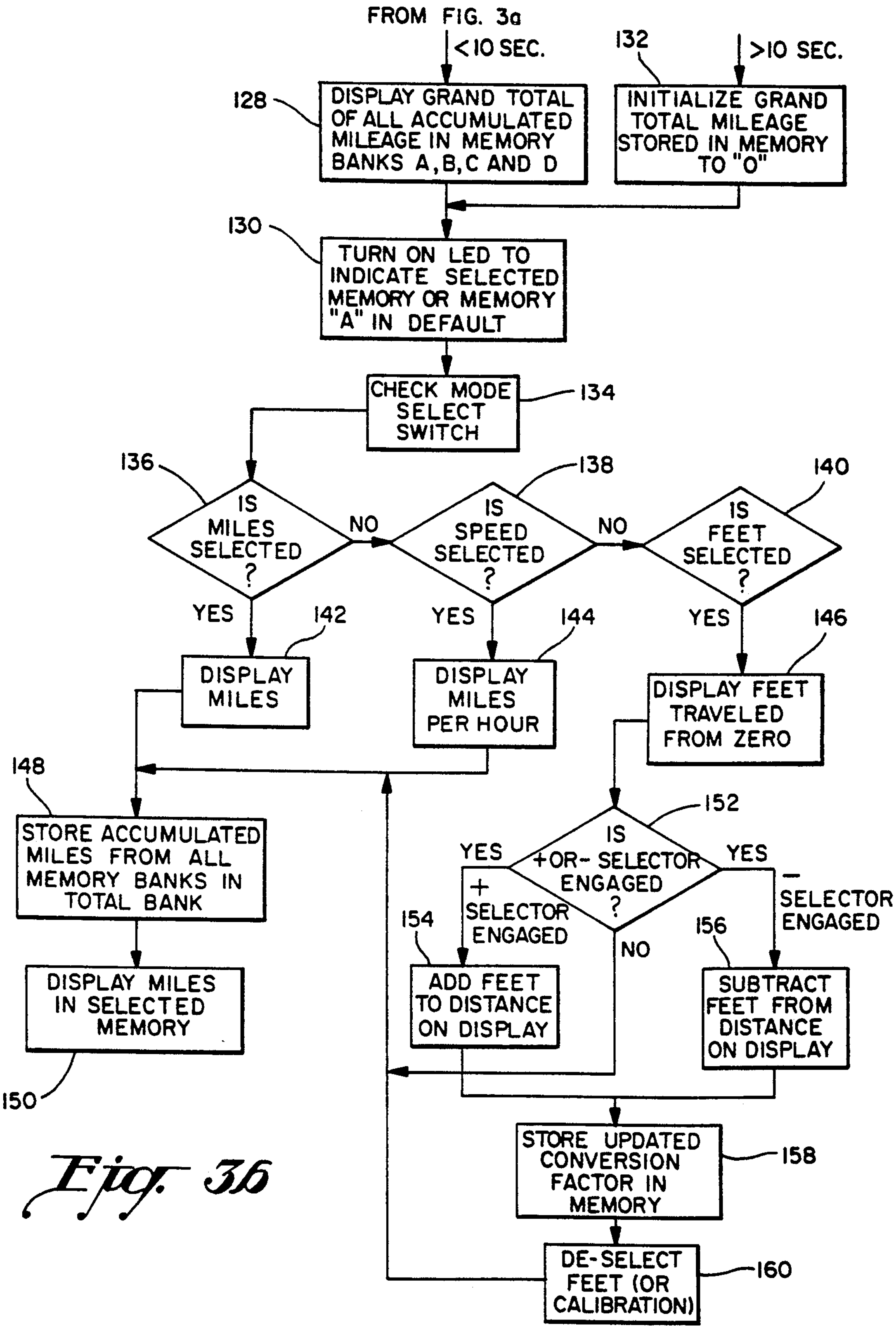

Referring to FIGS. 3*a* and 3*b*, there is shown a flow chart illustrating the operation of the mileage recording and display apparatus 20 of the present invention under the control of the microprocessor controller 22. In FIGS. 3*a* and 3*b*, an oval symbol indicates the start of an operational sequence, a rectangle indicates an instruction or set of instructions resulting in the performance of a control function, and a diamond indicates a decision based upon the comparison of binary signals within the microprocessor controller 22. The steps carried out in the operations shown in the flow charts of FIGS. 3*a* and 3*b* are stored in the form of commands and data within the microprocessor controller's ROM 30.

The operating program stored in ROM 30 is initiated at step 100 wherein the microprocessor controller 22 is initialized by resetting its control flags to an initial set of conditions whereupon the microprocessor controller 22 is ready for controlling the mileage recording and display apparatus 20 in accordance with the present invention. The microprocessor controller 22 initially outputs scanning signals to the display and control module 21 in order to detect engagement of one of the selectors thereon as well as the status of the three-position MODE switch 70. The program stored in the microprocessor controller's ROM 30 causes the microprocessor controller 22 to continuously scan the display and control module 21 until a user-initiated input command is detected. The microprocessor controller 22 is initialized at step 102, followed by automatic actuation of the audio alarm 25 for the purpose of reminding a user to select one of the memory banks for storage of mileage therein. The program then proceeds to step 106 and attempts to detect engagement of one of the memory bank selectors. If none of the memory banks is selected, the program then at step 110 goes to memory bank A for storage of mileage information therein by default. If at step 106 selection of a memory bank is detected, the program proceeds to the selected memory at step 108 for storage of mileage information therein.

The program then proceeds to step 112 to determine if a memory selector has been engaged for less than five seconds, greater than five seconds, or simultaneously with engagement of the TOTAL memory selector 80. If it is determined that a memory selector has been engaged for more than five seconds, the program branches to step 114 for resetting the current mileage in the selected memory to zero. The program then returns to the main operating program at step 126.

If at step 112, it is determined that a given memory selector is engaged for less than five seconds, the program branches to step 116, turns on the selected memory indicator, and displays the current mileage stored in the selected memory at step 118. The program then returns to the main operating program at step 126.

If at step 112, it is determined that a memory selector is engaged simultaneously with the TOTAL memory selector 80, the program proceeds to step 120 to determine if the memory selector and TOTAL memory selector 80 are engaged for less than or more than ten seconds. If it is determined at step 120 that these two selectors have been engaged for more than ten seconds, the program branches to step 124 and initializes the selected memory bank by setting its accumulated miles to zero. The program then returns to the main operating program at step 126. If at step 120, it is determined that a memory selector and the TOTAL memory selector 80 are engaged for a period less than ten seconds, the program proceeds to step 122 for displaying the accumulated mileage of the selected memory bank. The accumulated mileage may be recorded and stored over virtually any time period, such as from the beginning of the current year.

The program next proceeds to step 126 to determine if only the TOTAL memory selector 80 is engaged for less than or greater than ten seconds. If the TOTAL memory selector 80 is engaged for more than ten seconds, the program branches to step 132 and initializes the grand total mileage stored in all of the memories to zero. The program then returns to the main operating program at step 130. If it is determined at step 126 that the TOTAL memory selector 80 is engaged for less than ten seconds, the program proceeds to step 128 for displaying the grand total of all accumulated mileage in memories A, B, C and D.

The program then proceeds to step 130 for turning on a given LED to indicate the selected memory or, in the event of failure to select any of the memory banks, memory bank A in default. The program then proceeds to step 134 to determine the status of the mode selector switch 70. If at step 136 it is determined that "miles" is selected on the mode switch 70, the program causes the miles in the selected memory to be displayed at step 142. If at step 136, it is determined that "miles" is not selected, the program proceeds to step 138 to determine if "speed" is selected. If "speed" is selected on the mode switch 70, the program at step 144 causes the speed of the automobile in miles per hour to be displayed. If at step 138, it is determined that "speed" is not selected, the program proceeds to step 140 to determine if "feet" is selected. The program then proceeds to step 146 for displaying the distance traveled by the automobile in feet. Where miles or miles per hour is displayed, the program then proceeds to step 148 for storing the accumulated miles from all memory banks in the total memory bank. The program then proceeds to step 150 for displaying the miles in the selected memory.

After displaying the distance traveled by the automobile in feet at step 146, the program proceeds to step 152 to determine if either the "plus" or "minus" selector 157, 159 is engaged for calibrating the apparatus. If neither of these selectors is engaged, the program proceeds to step 148 for storing the accumulated miles from all memory banks in the total memory bank as previously described. If at step 152, it is determined that the "plus" selector 57 is engaged, the program proceeds to step 154 and adds feet to the distance presented on the multi-digit LED display 46 If at step 152, it is determined that the "-" selector 59 is engaged, the program proceeds to step 156 and subtracts from the number of feet presented on the LED display 46. Adding feet to the LED display 46 increases the odometer conversion factor, while subtracting from the feet presented in the LED display reduces the conversion factor used for converting the sensor output to a measured distance. The conversion factor is used in calibrating the distance measuring feature of the mileage recording and display apparatus 20. At step 158, the updated conversion factor is stored by the operating program in memory. The program then proceeds to step 160 for de-selecting the feet mode of the mode switch 70 and then proceeds to step 148 for storing the accumulated miles from all memory banks in the total memory bank as previously described. The program then proceeds to step 150 for displaying the miles in the selected memory on the multidigit LED display 46.

There has thus been shown a mileage recording and display apparatus which is particularly adapted for recording and displaying vehicle usage in either miles or feet for multiple business purposes or for business and personal use. The mileage recording and display apparatus allows one to record and display mileage for each type of use in terms of either current mileage or accumulated mileage for each such use over a selected time period. Appropriate controls and display information is provided to permit a user to conveniently and accurately record and store in memory the distance the vehicle is operated for virtually any number of individual, separately accountable activities.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for recording and displaying vehicle distance traveled related to a plurality of individual, discrete activities, said apparatus comprising:

a plurality of memory means for storing vehicle distance traveled;

control means coupled to the vehicle and to said plurality of memory means and responsive to a plurality of user selection input commands for accessing each of said memory means for storing distance traveled associated with a given individual activity in each of said memory means;

display means coupled to said control means for displaying distance traveled associated with each of said plurality of individual, discrete activities and stored in respective ones of said plurality of memory means; and first user responsive selection means coupled to said control means for selecting a first one of said plurality of memory means for storing distance traveled associated with one of said activities therein and for displaying the distance stored in said first one of said plurality of memory means, wherein when said first one of said plurality of memory means is deselected and a second one of said plurality of memory means is selected said second one of said plurality of memory means is not reset to zero permitting said second one of said plurality of memory means to continue to store said vehicle distance traveled associated with one of said activities in a cumulative manner, and wherein said first user responsive selection means includes first reset means for resetting vehicle distance in all of said plurality of memory means to 0 and second reset means for resetting vehicle distance in only one of said plurality of memory means to 0.

2. The apparatus of claim 1 further comprising second user responsive selection means for selecting and displaying a total vehicle distance traveled as stored in all of said memory means.

3. The apparatus of claim 1 further comprising default means for accessing a predetermined one of said plurality of memory means if none of said memory means is selected by said first user responsive selection means.

4. The apparatus of claim 1 further comprising third user responsive selection means coupled to said control means for selecting the display of vehicle distance traveled in either miles or feet.

5. The apparatus of claim 4 wherein said third user responsive selection means includes means for selecting and displaying vehicle speed on said display means.

6. The apparatus of claim 1 further comprising calibration means coupled to said control means for calibrating distance measurement by the apparatus.

7. The apparatus of claim 6 wherein said calibration means includes fourth user responsive selection means coupled to said control means for increasing or decreasing distance measured and displayed after the vehicle travels a known, fixed distance.

8. The apparatus of claim 1 further comprising alarm means coupled to said control means for alerting a user to select one of said plurality of memory means for storing vehicle distance traveled therein.

9. The apparatus of claim 1 further comprising recording means coupled to said control means for recording said vehicle distance traveled in hard copy form.

10. The apparatus of claim 9 wherein said recording means includes a printer.

* * * * *